Feb. 13, 1934. S. H. PELTIER 1,946,879
MEANS FOR AND METHOD OF MAKING AGATIZED BODIES
Filed Feb. 6, 1931
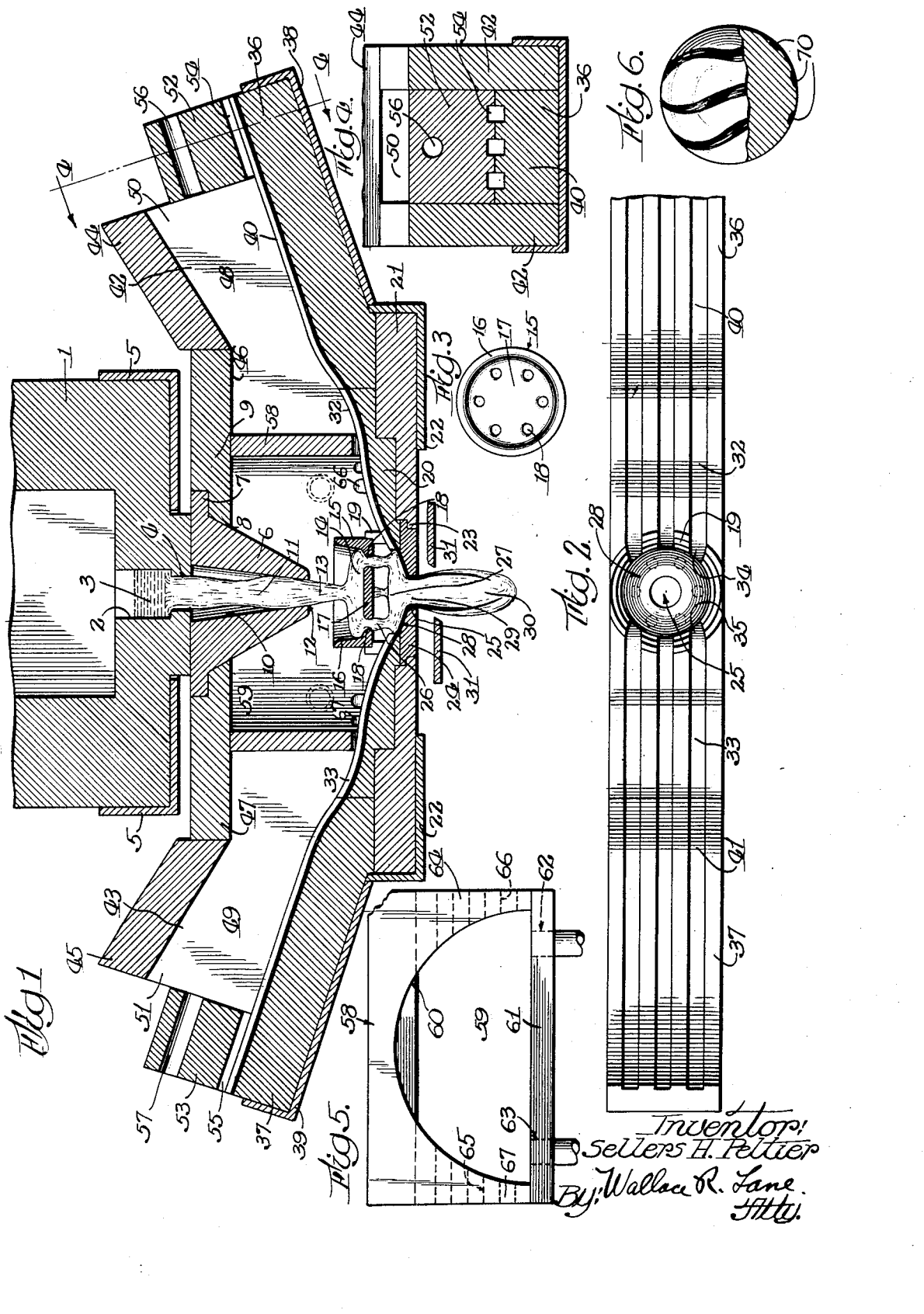

Patented Feb. 13, 1934

1,946,879

UNITED STATES PATENT OFFICE 1,946,879

MEANS FOR AND METHOD OF MAKING AGATIZED BODIES

Sellers H. Peltier, Ottawa, Ill.

Application February 6, 1931. Serial No. 513,907

11 Claims. (Cl. 49—55)

The present invention relates to the making or producing of agatized bodies, such as marbles, from molten material, such as vitreous and like matter.

Among the objects of the invention are to provide a novel means and a novel method of making or producing agatized bodies, such as marbles with color portions in the surface of the bodies.

In a specific illustrative embodiment of the invention a molten stream of vitreous material, which is intended to form the body portion of the body, is flowed from a furnace tank through a spout into a heated chamber and upon a deflector having discharge openings. The stream discharges through these openings and on to a shallow trough having a discharge orifice. The material forms in a pool in the trough and flows through the orifice to form a depending lobe or gob to be cut off. The gob is then rolled in a forming means, to shape the same into the desired article, such as a marble.

At the sides of the trough are provided inclined channels or ducts each conducting a flowing stream of color material or substance. The channels or ducts extend into the trough and terminate in the border or edge of the pool to cause a flow of the color streams into the edge or border of the pool and to form striæ in the surface of the stream or lobe flowing from the orifice. When the cut-off portion is formed in the forming machine, these color portions are located in the surface portion of the shaped or formed body. An example of such an object is shown in Figure 6.

Other objects, advantages, capabilities, process steps and features are comprehended by the invention as will later appear and as are inherently possessed thereby.

Referring to the drawing:

Fig. 1 is a transverse sectional view through a furnace following the invention;

Fig. 2 is a top plan view of the means for supplying the color substance;

Fig. 3 is a top plan view of a deflecting receptacle or tray;

Fig. 4 is a sectional view with parts shown in elevation, taken in a plane represented by line 4—4 in Fig. 1;

Fig. 5 is a top plan view of a heating chamber for the flowing stream; and

Fig. 6 is a view of a finished object and showing the color markings in the surface portion of the object.

Referring more in detail to the drawing, the embodiment selected to illustrate the invention is shown with a melting furnace or tank 1 having a channel 2 in which the molten vitreous material 3 flows to and through a discharge orifice 4. The tank is supported by any suitable means such as frame elements 5.

Beneath the orifice 4 is located a discharge duct or spout 6 preferably of cone shape and having a flange 7 set upon a shoulder 8 of top plate 9. The spout 6 has a downwardly tapered duct or passage 10 through which the stream 11 of the vitreous material flows. This stream contacts with the inclined wall of the passage 10 and discharges through an orifice 12 at the lower end of the passage 10, and flows in a stream 13 into a pool 14 on a deflecting member 15 which is preferably in the form of a receptacle having a rim 16 and a bottom 17 provided with a number of discharge orifices 18. The receptacle 15 sits upon shouldered lugs 19 formed integral with a plate 20 suitably carried on a supporting plate 21 in turn carried by frame supporting elements 22.

Beneath the plate 20 and suitably supported on shoulders 23 of the plate 21, is a shallow trough 24 or the like having a discharge orifice 25.

The pool of vitreous material 14 flows through the orifices 18 into streams 26 to form a pool 27 on the inclined surface 28 of the trough member 24. This pool then flows in the form of a stream 29 through the orifice 25 and into a lobe or gob 30 which may be cut off by the shears 31 or other similar suitable means.

The plate 20 has a plurality of inclined channels 32 and 33 having their discharge ends 34 and 35 in the border or margin or edge of the pool 27 and the inclined surface 28 of the trough so as to supply molten color material or substance to such portion of said pool 27 and hence into the surface portion of the stream 29 and gob 30.

On each side of plate 20 are located blocks 36 and 37 suitably supported by frame elements 38 and 39 and also on plate 21. These blocks 36 and 37 have inclined channels 40 and 41 registering at their lower ends with the channels 32 and 33 of plate 20.

At the sides of blocks 36 and 37 are side walls 42 and 43 upon which are supported cover plates 44 and 45, and also the cover plate 9 resting on shoulders 46 and 47. These side walls 42 and 43 together with the cover plates 44 and 45, and the blocks 36 and 37, enclose chambers having openings 50 and 51.

At the upper ends of these chambers 48 and 49 are located blocks 52 and 53 having grooves 54 and 55 registering over channels 40 and 41, and also having passages 56 and 57 through which are projected burner flames to be maintained in the chambers 48 and 49 for maintaining the color material in the channels 40 and 41, in molten state. Air to support combustion may enter at openings 50 and 51.

Over the plate 22 and supported thereon, is a block 58 enclosing a substantially semi-cylindrical chamber 59 having a curved back wall 60 and a front wall 61 having ports 62 and 63 through which burner flames may be projected. These flames hit the curved wall 60 and are deflected and distributed in the chamber 59 so as to maintain the streams 13 and 26, and the pools 14 and 27 in molten condition. The end portions 64 and 65 are formed with grooves 66 and 67 registering with the channels 32 and 33 of the block or plate 20. The walls between the channels 32, and 33, support the block 58 by way of the parts between the grooves 66, and 67. The plate 9 also rests on top of the block 58. (See Fig. 1.)

In operation, the vitreous or similar material going to making up the body of the final object, is melted in the furnace 1, and when in molten state, it flows along the channel 2 and into and through the orifice 4 into stream 11. The latter touches the sides of the passage 10 and discharges through the orifice 12 into stream 13 which falls upon the bottom 17 of the member 15 and forms a pool 14. This aids in making this material homogeneous.

Streams 26 then flow from the pool 14 through the orifices 18 and form a pool 27 on the inclined surface 28 of the trough member 24 and also submerges the orifice 25 in member 24.

At the same time color materials or substances are introduced at the upper ends of the channels 40 and 41 either in non-molten or molten state. As these color substances move downwardly in channels 40 and 41 and through chambers 48 and 49, the heat from the flames therein, melt and/or maintain in molten condition the color material. The latter therefore flows downwardly in channels 40—32, and 41—33 to be discharged into the border or margin of pool 27. It will be noted that the discharge ends of channels 32 and 33 are located in alternate relation with the falling streams 26, so that the color streams will not become diffused nor dispersed in the pool 27.

The pool 27 with the color material supplied to it, then flows downwardly through orifice 25 to form a stream 29 and a gob 30. The color substances lie in the surface of this stream 29 and gob 30 and appear as distinct color lines or stripes in such surface. When the gob is cut-off and formed in a forming machine into the final object, such as a marble, the color portions lie in the surface of the object as shown at 70 in Fig. 6.

Any number of colors may be used in the color streams in accordance with the fancy desired. By the present invention, the color parts may be substantially evenly or uniformly distributed whereby the variegated design produced in the surface of the final object may be substantially regular.

All parts are of refractory material except the supports 5, 22, 38, and 39 and the shears 31.

While I have herein described and in the drawing shown an illustrative embodiment of the invention and for carrying out the invention, it is to be understood that the invention is not limited thereto, but may comprehend other structures, arrangements of parts, details, features and process or method steps or acts, without departing from the spirit thereof.

Having thus disclosed the invention,

I claim:

1. In a method of producing agatized bodies, the steps of forming a pool of molten vitreous material, flowing a stream from said pool through said orifice, and supplying a coloring substance to the border of said pool to form colored portions in the surface of said stream.

2. In a method of producing agatized bodies, the steps of flowing streams of molten material into a pool, and flowing color streams of molten material into the border of said pool to form color portions in the surface of the material flowing from the pool.

3. In a method of producing agatized bodies, the steps of flowing streams of molten material into a pool, and flowing color streams of molten material into the border of said pool, at points separated from the points of entry of said first mentioned streams.

4. In a method of producing agatized bodies, the steps of flowing streams of molten material into a pool, and flowing color streams of molten material into the border of said pool at points separated from the points of entry of said first mentioned streams, and flowing a stream from said pool with the color portions in the surface of said last mentioned stream.

5. A device for producing agatized bodies, comprising means for forming a pool of molten vitreous material, means for flowing a stream of said material from said pool to form a second pool thereunder, means for flowing molten color substance into the border of said second pool to form color portions in the surface of said pool, and means for discharging said second pool whereby said color portions will be on the surface of the discharge.

6. In a device for producing agatized bodies and comprising means for forming a pool of molten vitreous material, ducts extending to the border of said pool for supplying color material into the surface thereof.

7. In a device for producing agatized bodies and comprising means for flowing streams of molten vitreous material into a pool, means for discharging a stream from said pool, and ducts extending to said pool and alternating with the streams flowing to said pool and for supplying color material to said pool.

8. In a method of making agatized bodies, the steps of pendently flowing a stream of vitreous material into a pool, flowing a color stream into the border of said pool, and flowing the material of the pool with the color component in the surface thereof to form a suspended charge.

9. In a method of making agatized bodies, the steps of pendently flowing a stream of vitreous material into a pool, pendently flowing streams from said pool to form a second pool, flowing a color stream into the border of said second pool, and flowing the material of said second pool to form a suspended charge.

10. A device for producing agatized bodies, comprising means for holding a pool of vitreous material, means for pendently flowing a stream into said pool holding means, means for flowing a stream of color material into the border of the pool in said pool holding means, and means for flowing the material of the pool with the color component in the surface thereof to form a suspended charge.

11. A device for producing agatized bodies, comprising means for holding a pool of vitreous material, means for holding a second pool of vitreous material, means for flowing a stream of vitreous material into said first pool holding means, means for flowing the material of said first pool into said second pool holding means, means for flowing a color stream into the border of the pool in said second pool holding means, and means for flowing the material in said second pool holding means to form a suspended charge.

SELLERS H. PELTIER.